US009096128B2

(12) United States Patent
Shaw et al.

(10) Patent No.: US 9,096,128 B2
(45) Date of Patent: Aug. 4, 2015

(54) CREATING A SENSORY EXPERIENCE IN A VEHICLE

(71) Applicants: David I. Shaw, Portland, OR (US); Rita H. Wouhaybi, Portland, OR (US)

(72) Inventors: David I. Shaw, Portland, OR (US); Rita H. Wouhaybi, Portland, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/740,510

(22) Filed: Jan. 14, 2013

(65) Prior Publication Data

US 2014/0200762 A1   Jul. 17, 2014

(51) Int. Cl.
*G06F 17/00* (2006.01)
*B60K 35/00* (2006.01)

(52) U.S. Cl.
CPC ..................... *B60K 35/00* (2013.01)

(58) Field of Classification Search
CPC ....................................................... B60K 35/00
USPC .......................................................... 701/36
See application file for complete search history.

(56) References Cited

U.S. PATENT DOCUMENTS

| 6,980,092 | B2 | 12/2005 | Turnbull et al. | |
|---|---|---|---|---|
| 2009/0112394 | A1 | 4/2009 | Lepejian et al. | |
| 2009/0299857 | A1* | 12/2009 | Brubaker | 705/14.66 |
| 2010/0088163 | A1 | 4/2010 | Davidson et al. | |
| 2010/0136944 | A1* | 6/2010 | Taylor et al. | 455/404.1 |
| 2010/0161171 | A1 | 6/2010 | Valentine et al. | |

FOREIGN PATENT DOCUMENTS

WO   2006/129298 A2   12/2006
WO   2014/110571 A1   7/2014

OTHER PUBLICATIONS

International Search Report and Written Opinion received for PCT Patent Application No. PCT/US2014/011478, mailed on May 8, 2014, 24 pages.

* cited by examiner

*Primary Examiner* — Mary Cheung
*Assistant Examiner* — Yuen Wong
(74) *Attorney, Agent, or Firm* — Sutherland Asbill & Brennan LLP

(57) ABSTRACT

Systems and methods directed to creating a sensory experience in a vehicle are described herein. Data may be received from one or more sources. Device data may be generated based at least in part on the received data. One or more output components associated with the vehicle may be identified. The device data may be transmitted to one or more output components for output to a user of the vehicle.

16 Claims, 8 Drawing Sheets

CREATING A SENSORY EXPERIENCE IN A VEHICLE

TECHNICAL FIELD

Embodiments of this disclosure relate generally to information systems in vehicles, and more particularly, to creating a sensory experience in a vehicle.

BACKGROUND

Vehicles may vary in function as well as form. Variations in style, size, and implementation permit people to choose from many different vehicles even within a specific budget. However, once a person buys a vehicle, it is often costly and inconvenient to customize or change the interior of the vehicle.

BRIEF DESCRIPTION OF THE FIGURES

The detailed description is set forth with reference to the accompanying figures. In the figures, the left-most digit(s) of a reference number identifies the figure in which the reference number first appears. The use of the same reference numbers in different figures indicates similar or identical items.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout,

DETAILED DESCRIPTION

Embodiments of the disclosure are described more fully hereinafter with reference to the accompanying drawings in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Certain embodiments herein may be directed to creating a sensory experience in a vehicle. For example, in some embodiments, a system may comprise one or more output modalities that would allow the user to create sensory experiences within a vehicle. The system may have the capability to capture, share, and recreate experiences and project them onto surfaces, such as the interior of a vehicle. In some embodiments, the system may be capable of detecting, saving, and recreating a surrounding sensory experience (e.g., dashboard displays, audio displays, climate control displays) in the form of device data. Sensed data may be captured from sensors associated with a vehicle, downloaded from a website or remote server, or set manually from a customization application. The device data may be generated based at least in part on the sensed data. The device data may be used to augment the in-car sensory experience of a person. In some embodiments, a person may choose to use the settings of a saved or downloaded sensory experience, create a customized in.-car experience from a base experience setting, or augment saved or downloaded device data set.

In sonic embodiments, device data may be uploaded to a website or application store. The device data may be available for download for a fee or may be made available for free.

Figure 1:
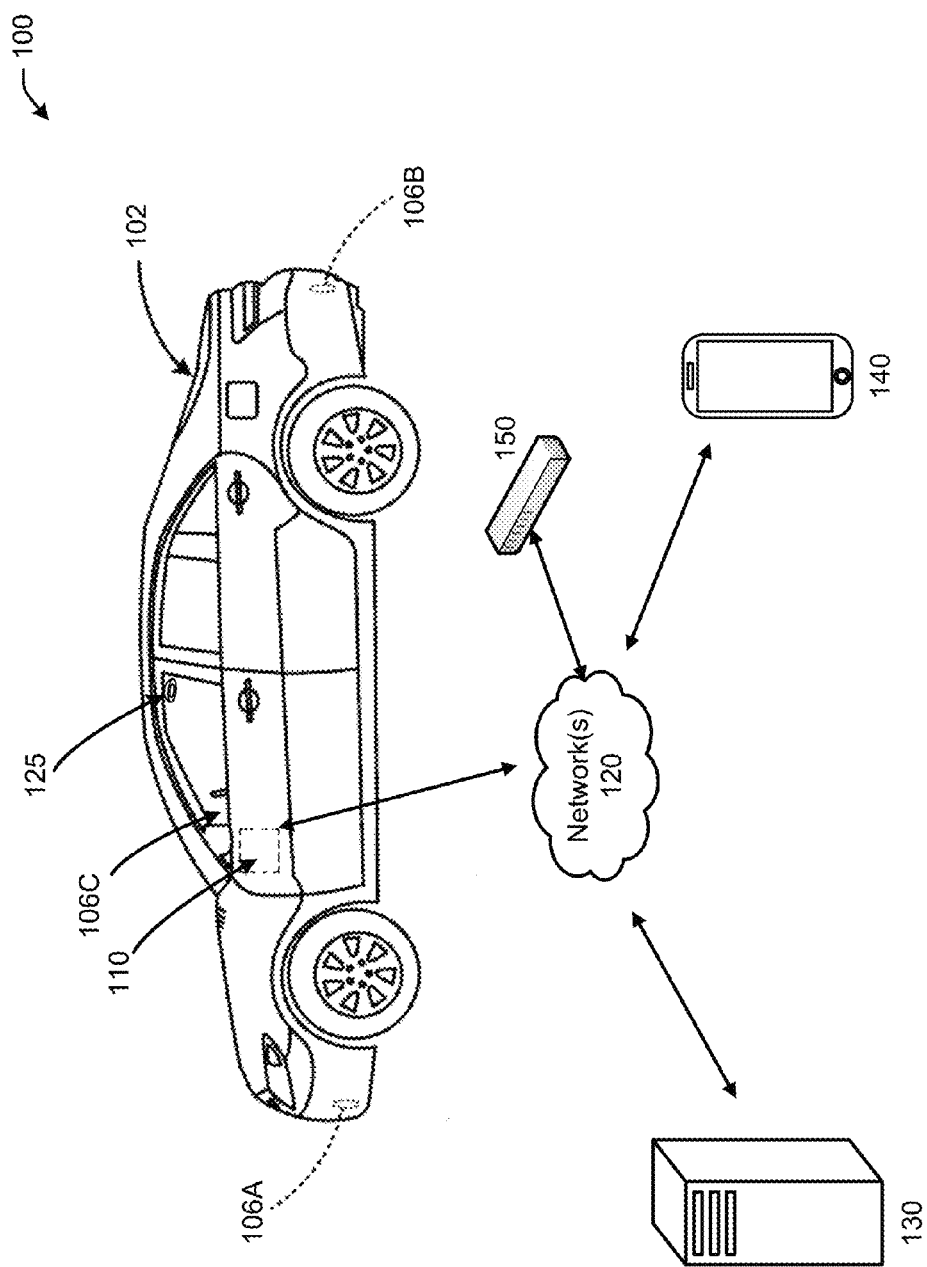
FIG. 1 is a diagram of a configuration for creating a sensory experience in a vehicle, in accordance with an embodiment of the disclosure.

FIG. 1 illustrates an example system configuration 100 for creating a sensory experience in a vehicle, in accordance with an embodiment of the disclosure. The configuration may include a sensory experience device 150 in association with the vehicle 102. The configuration may include, but is not limited to, one or more vehicles 102. The vehicle 102 may include one or more systems that include one or more processing devices for implementing functions and features associated with the vehicle 102, as will be discussed in detail below. The vehicle 102 may include one or more sensors 106A-106C (collectively referred to as 106) capable of capturing sensed data associated with the vehicle 102. For example, the sensors 106 may be external video cameras 106A, 106B that may capture sensed data, such as video, regarding road conditions as the vehicle 102 progresses on its trip, or a microphone 106C which may capture sounds in the environment.

The vehicle 102 may include a vehicle on-board platform, such as an in-vehicle infotainment (IVI) system 110. As used herein, an IVI system 110 may refer to a system in a vehicle 102 that provides entertainment and informational features for the vehicle 102. The IVI system 110 may be part of the vehicle's main computer or a stand-alone system. The IVI system 110 may communicate with a system for creating a sensory experience in a vehicle 102, as described herein. The IVI system 110 may further include one or more processors communicatively coupled to an electronic memory, described in detail below.

The vehicle 102 may establish a connection with a remote server 130 over one or more types of networks 120, such as a wireless fidelity (Wi-Fi) network, a Wi-Fi. Direct network, Bluetooth®, a radio network, a cellular network (e.g., third generation or fourth generation), a satellite network, a cable network, a landline-based network, the Internet, intranets, a telephone network, a television network, data networks, or other communication mediums connecting multiple computing devices to one another, as non-limiting examples. According to certain embodiments herein, multiple networks may be leveraged by the vehicle 102 to enable communication with the remote server 130.

In some embodiments, the vehicle 102 may be configured to be coupled to an electronic device 140. The electronic device 140 may include one or more electronic device processors communicatively coupled to an electronic device memory, as well as a user interface and an output element, such as a speaker of the vehicle 102. The electronic device 140 may communicate with the vehicle 102 via a communicative link. In certain embodiments herein, devices related to the implementation of creating a sensory experience in a vehicle 102 may exist onboard an IVI system 110 such that the functionality described herein may be associated with the IVI system 110. In other embodiments, the functionality described herein may reside independently of other systems or may be associated with various other systems.

The IVI system 110 may he in communication with one or more electronic devices 140, in one aspect, an electronic device 140 may serve as an extension of the IVI system 110. For example, if the IVI system 110 does not have Internet capabilities, the IVI system 110 may communicate with an electronic device 140 associated with the vehicle 102 to utilize the communication capabilities of the electronic device 140.

The communicative link may be any suitable electronic communication link including, but not limited to, a hardwired connection, a serial link, a parallel link, a wireless link, a Bluetooth® channel, a ZigBee® connection, a wireless fidelity (Wi-Fi) connection, a Near Field. Communication (NFC) protocol, a proprietary protocol connection, or combinations thereof. In one aspect, the communicative link may be secure such that it is relatively difficult to intercept and decipher communications between the electronic device 140 and the IVI system 110. In certain embodiments, the communicative link may be encrypted. Further, in certain embodiments, the communications may be encrypted at more than one open systems interconnection (OSI) model layer. For example, the communications between the electronic device 140 and the vehicle 102 may be encrypted at both the application layer and the transport or link layer. In some embodiments, the communicative link may be through the communication capabilities of an electronic device 140 associated with the vehicle 102. For example, if the vehicle 102 does not have Internet capabilities, the IVI system 110 may be able to access data through its association with, for example, an electronic device 140 such as a smartphone with cellular communication capabilities.

For the purposes of this discussion, the vehicle 102 may include, but is not limited to, a car, a truck, a light-duty truck, a heavy-duty truck, a pickup truck, a minivan, a crossover vehicle, a van, a commercial vehicle, a private vehicle, a sports utility vehicle, a tractor-trailer, an aircraft, an airplane, a jet, a helicopter, a space vehicle, a watercraft, a motorcycle, or any other suitable vehicle with information and media capability. However, it will be appreciated that embodiments of the disclosure may also be utilized in other transportation or non-transportation related applications where creating a sensory experience in a vehicle may be implemented.

Vehicle sensors may he any suitable data-gathering element associated with the vehicle 102. As a result, vehicle sensors may gather audio, visual, tactile, or environmental information within or associated with the vehicle 102. The data gathered by one or more sensors associated with the vehicle 102 may be referred to as "sensed data." The vehicle sensors may include one or more cameras 106 in the cabin of the vehicle 102 that may capture images of the environment and scene information, such as lighting conditions within the vehicle 102 or weather outside of the vehicle 102. Vehicle sensors may also be GPS devices, a microphone 106C, seat weight sensors, or other types of data-gathering elements associated with the vehicle 102.

Furthermore, suitable electronic devices 140 can include, but are not limited to, smartphones, tablets, laptop computers, electronic book reading devices, processor-based devices, etc. In some embodiments, the system may include one or more projectors 125 to project images onto the interior surfaces of the vehicle 102. For example, one or more projectors 125 in the cabin may project images on dashboard panels, windows, windshields, furniture, and other surfaces of the vehicle 102 to create a sensory experience for the person in the vehicle 102.

The sensory experience device 150 may be a stand-alone device or device integrated with the vehicle 102. The sensory experience device may capture experiences associated with a vehicle 102, download experiences from other sources outside of the vehicle 102, and may recreate the experiences within the vehicle 102. Details of an example sensory experience device 150 are included below.

Figure 2:
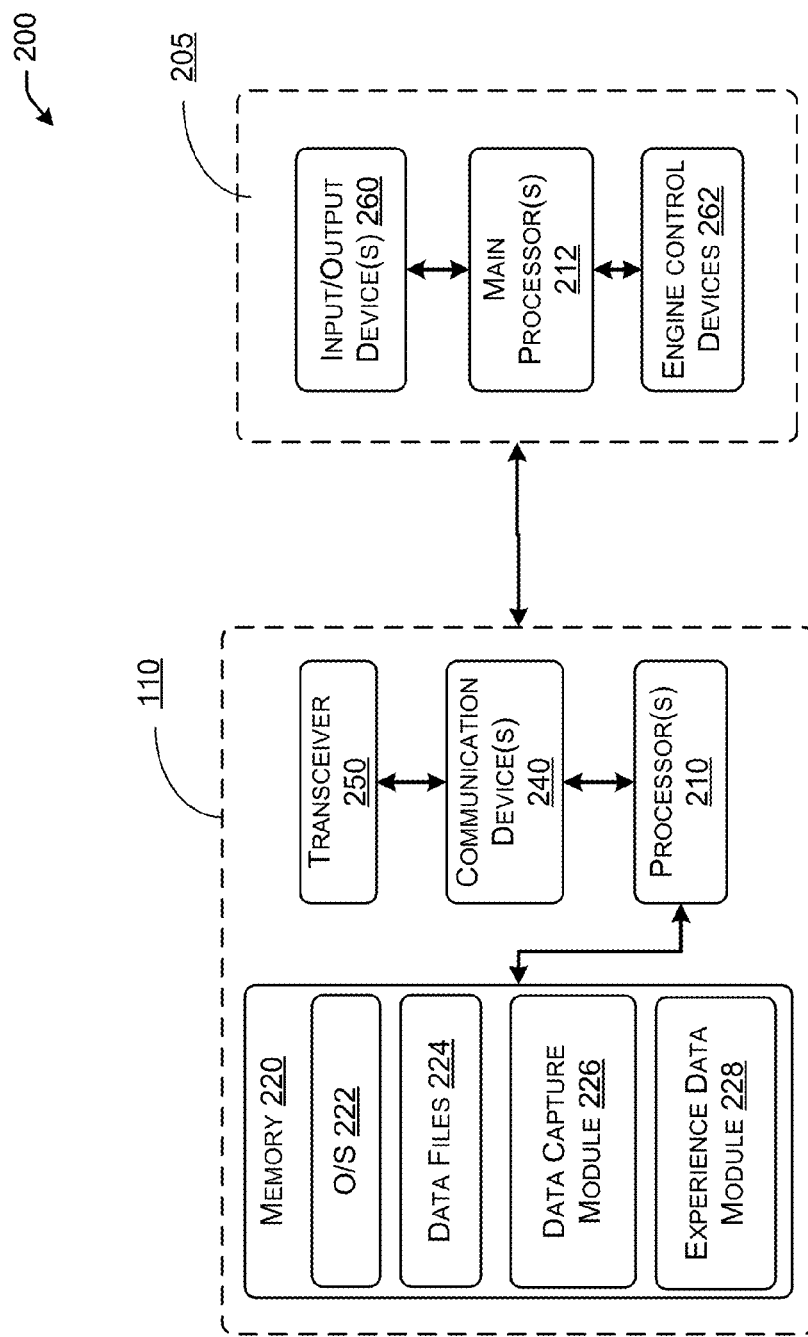
FIG. 2 is a block diagram of an example vehicle computing system for creating a sensory experience in a vehicle, in accordance with an embodiment of the disclosure.

FIG. 2 depicts a block diagram of an example vehicle computing system 200 in a vehicle, e.g., vehicle 102 in FIG. 1, for creating a sensory experience in a vehicle 102 with image processing support in an IVI system 110, among other things. As shown in FIG. 2, multiple vehicle systems may interact to facilitate creating a sensory experience in a vehicle. For example, a computing system 205 may exist for controlling a vehicle's standard devices or components, which may include engine devices, braking devices, power steering devices, door control devices, window control devices, etc., in one embodiment. The computing system 205 may also include various input/output (I/O) devices 260 that may exist in a vehicle 102, such as collection devices, such as vehicle sensors (e.g., a microphone, seat weight sensors, cameras, both interior-facing cameras for capturing images within a vehicle 102 and exterior-facing cameras 106.A, 1069 for capturing images from a vehicle's surroundings) and display devices, such as light-emitting diode (LED) displays and organic light-emitting diode (OLED) displays, as non-limiting examples. A main processor 212 may communicate with the standard engine control devices 262 and I/O devices 260 to activate the devices, send information to these devices, or collect information from these devices, as non-limiting examples.

The computing system 205 may be in communication with the with system 110. As used herein, an IVI system may refer to a system in a vehicle that provides entertainment and informational features for the vehicle. The with system 110 may include, but is not limited to, a processor 210, a memory 220, one or more communication devices 240, and a transceiver 250. The processor 210 may communicate with the communication devices 240 in the IVI system 110. For example, the processor 210 may communicate with the memory 220 to execute certain computer-executable instructions or modules, such as 226, 228, stored in the memory 220 to facilitate creating a sensory experience in a vehicle 102 as described herein. In one embodiment, the processor 210 may also communicate with the one or more communication devices 240 to send and receive messages from various types of networks, such as those listed above. A transceiver 250 may facilitate the sending and receipt of such messages. In some embodiments, a transmitter and a separate receiver may be utilized to send and receive messages, respectively.

According to certain embodiments herein, the processor 210, the memory 220, the communication devices 240, and the transceiver 250 may be onboard a system in the IVI system 110. In this way, these devices may operate out of band, or with access to only minimal power, such as in association with a vehicle shutdown, hibernation, or standby, as non-limiting examples. In one example, a backup battery may be used to provide sufficient power to enable the devices in the IVI system 110 to operate out of band. Thus, the devices in the IVI system 110 may remain awake (e.g., after a vehicle 102 has been shut down) and may provide certain functionality, such as communicating with a user device, e.g., an electronic device, to send and receive messages in association with creating a sensory experience in the vehicle 102. Such functionality may be referred to herein as out of band or operating out of band. The devices in the IVI system 110 may also communicate with one another while operating out of band. For example, the processor 210 may communicate with the memory 220 to execute computer-executable instructions or modules therein while operating out of band.

The devices and/or program modules in the computing system 205 may shut down when a vehicle 102 is powered down, for example, and therefore may not operate out of band. For example, a main operating system (not shown) that may control standard components in a vehicle 102, such as an engine, brakes, doors, windows, hard disks, or other devices in communication with the main operating system or one of its program modules, may not be operational when the vehicle 102 is shut down. The operating system (0/S) 222 in the memory 220, however, may be operational when the vehicle 102 is shut down, or otherwise is in a low power state such as hibernation or standby, because it may be located onboard or at the board level in firmware, according to certain embodiments herein. Such a configuration may enable devices in the IVI system 110 to send messages, receive messages, and cause the performance of creating a sensory experience in the vehicle 102. As an example, according to certain embodiments, the processor 210 of the IVI system 110 may communicate with the main processor 212. (and/or other devices) of the computing system 205 to wake the main processor 212 so that it may cause performance of the functions requested by a user via one or more action codes. In one embodiment, such communication may occur via the CAN BUS protocol, as will be described in greater detail below.

The processors 210 and 212 may include any number of suitable processing devices, such as a central processing unit (CPU), a digital signal processor (DSP), a reduced instruction set computer (RISC), a complex instruction set computer (CISC), a microprocessor, a microcontroller, a field programmable gate array (FPGA), or any combination thereof. In one embodiment, the vehicle computing system 200 may be based on an Intel® Architecture system, and the processors 210 and the chipset may be from a family of Intel® processors and chipsets, such as the Intel® Atom® processor family. The processor 210 may also include one or more processors as part of one or more application-specific integrated circuits (ASICs) or application-specific standard products (ASSPs) for handling specific data processing functions or tasks. Additionally, any number of suitable I/O interfaces and/or communications interfaces (e.g., network interfaces, data bus interfaces, etc.) may facilitate communication between the processors 210 and other components of the vehicle computing system 200.

The one or more communication devices 240 may facilitate communications between the vehicle computing system 200 and other devices that may be external to a vehicle 102 containing the vehicle computing system 200. For example, the one or more communication devices 240 may enable the vehicle computing system 200 to receive messages from an electronic device 140 and/or send messages to an electronic device 140 as illustrated in FIG. 1. The communication devices 240 may enable various types of communications over different networks, such as wireless networks including, but not limited to, a wireless fidelity (Wi-Fi) network, a Wi-FI Direct network, a radio network, a cellular network, a GPS network, a ZigBee® connection, a Bluetooth® channel, proprietary protocol connections, and other wireless links, as well as hardwired connections, serial link connections, parallel link connections, or combinations thereof.

According to various configurations, one or multiple interface cards or circuits may support the multiple networks named above. In one embodiment, such one or more interface cards or circuits may be onboard such that firmware in the memory 220 may access and control communications associated with the IVI system 110.

Turning now to the contents of the memory 220, the memory 220 may include any number of suitable memory devices, such as caches, read-only memory devices, random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read-only memory (EEPROM), non-volatile RAM (NVRAM), universal serial bus (USB) removable memory, magnetic storage devices, removable storage devices (e.g., memory cards, etc.), and/or non-removable storage devices. As desired, the memory 220 may include internal memory devices and/or external memory devices in communication with the vehicle computing system 200.

The memory 220 may store data, executable instructions, and/or various program modules utilized by the processor 210. Examples of data that may be stored by the memory 220 include data files 224 and any number of suitable program modules and/or applications that may be executed by the processor 210, such as, but not limited to, an operating system (O/S) 222, a data capture module 226, and an experience data module 228. Each of these modules may be implemented as individual modules or, alternatively, one or more of the modules may perform all or at least some of the functionality associated with the other modules. In certain embodiments, these modules may be stored as firmware in a read-only memory 220, thereby making it more difficult for the functions described herein to be tampered with or disabled.

The data files 224 may include any suitable information that may facilitate creating a sensory experience in a vehicle 102. Example information may include, but is not limited to, information that may be used to authenticate an electronic device 140, capture data through one or more image sensors 106, process images, and obtain information from a remote server 130, as well as other information that may facilitate the processes described herein.

The O/S 222 may include a suitable module or application that facilitates the general operation of the vehicle computing system 200, as well as the execution of other program modules illustrated in the memory 220 in FIG. 2.

The data capture module 226 may perform a number of functions to facilitate receiving data from one or more sensors associated with the vehicle 102. For example, the data capture module 226 may establish a connection and communicate with sensors associated with the vehicle 102 or sensors associated with one or more devices 140 associated with the vehicle 102 (e.g., cell phone, microphone, camera associated with the vehicle 102). In some embodiments, the data capture module 226 may receive data captured by input/output device(s) 260 of the vehicle 102 through the IVI system 110. In some embodiments, the data capture module 226 may receive data from a source outside of the vehicle 102 such as a remote server 130 or a website.

The experience data module 228 may perform a number of functions to facilitate creating a sensory experience in a vehicle. For instance, the experience data module 228 may receive or otherwise obtain information from one or more sources. The experience data module 228 may generate device data to be used to create a sensory experience in a vehicle 102 based at least in part on the sensed data received from the data capture module 226 or another source. Further, experience data module 228 may process sensed data using one or more applicable techniques or algorithms. The experience data module 228 may store the device data, either locally or in storage outside of the vehicle 102 (e.g., database, website, cloud storage). The experience data module 228 may also transmit the device data generated to one or more output modalities e.g., speakers, projector, or the like) to create a sensory experience in the vehicle 102.

The systems and methods for creating a sensory experience in a vehicle may have a supported mode, wherein a vehicle manufacturer may enable, facilitate, or aid in the augmentation of the in-vehicle experience. Such vehicles 102 may have one or more data ports available in the vehicle 102 to transmit sensed data captured by the vehicle sensors to the data capture module 226 and/or the experience data module 228 and/or receive data from the modules 226, 228 instructing one or more vehicle components to create a sensory experience. The sensed data received via the available data ports may enable the experience data module 228 to process the received sensed data and generate device data that may be used to create a sensory experience in a vehicle 102. In some embodiments, the vehicle 102 may have one or more user interfaces to enable greater in-vehicle customizations for the sensory experience in the vehicle 102.

The systems and methods for creating a sensory experience in a vehicle 102 may have a generic mode, wherein the vehicle manufacturer may not have the capabilities of a supported mode (e.g., data ports) to enable, facilitate, or aid in the augmentation of the in-vehicle sensory experience. For example, a supported mode may not be available on older model vehicles and thus the systems and methods for creating a sensor experience in a vehicle 102 may require a generic mode. The systems and methods for creating a sensory experience in a vehicle 102 may detect the surrounding interior surfaces of the vehicle 102 and may compose a sensory experience to be completely outputted by a device without any communication with any components of the vehicle 102.

In addition to or alternative to the memory 220, other embodiments may include one or more suitable computer-readable media that may be provided for storing computer-executable instructions such as those stored in the memory 220. One or more processing devices, such as the processor 210, may execute such computer-executable instructions to facilitate the remote management of a vehicle, as described above in association with the modules 226, 228 in the memory 220. As used herein, the term "computer-readable medium" may describe any form of suitable memory or memory device for retaining information in any form, including various kinds of storage devices (e.g., magnetic, optical, static, etc.). Indeed, various embodiments of the disclosure may be implemented in a wide variety of suitable forms.

Although the modules above have been described in conjunction with a vehicle computing system 200, one or more modules may reside on any computing device associated with the system for creating a sensory experience in a vehicle 102, as described herein. For example, one or more modules of the system may reside on the vehicle 102 and receive data from the one or more sensors or data sources. The modules for creating a sensory experience in a vehicle 102 may reside on a remote server (e.g., server 130). In some embodiments, some of the device data may be generated on the vehicle 102 while some of the device data may be generated on one or more devices other than the vehicle 102, such as an electronic device 140 or a server 130. In some embodiments, a device other than the vehicle 102 (e.g., electronic device 140 or server 130) may receive sensed data from one or more sensors 106 associated with the vehicle 102 or sensed data from one or more sources, such as a website, database, or the like and generate device data based at least in part on the received sensed data. In some embodiments, one or more modules may reside on a sensory experience device 150.

Figure 3A:
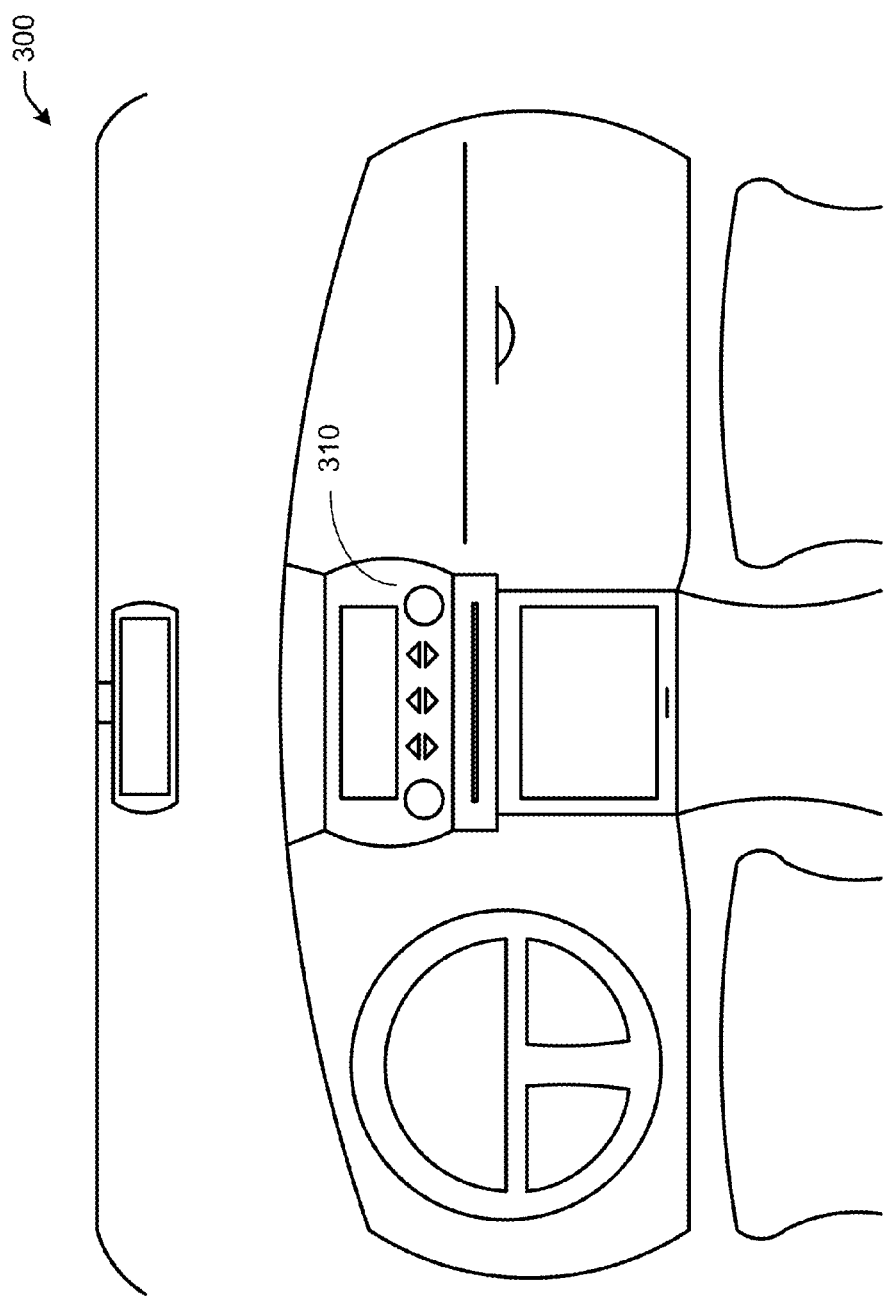
FIG. 3A is a diagram of an example interior of a vehicle.

FIG. 3A is a diagram of an example interior 300 of a vehicle 102. In this illustration, the interior 300 of the vehicle 102 includes a dashboard. In sonic embodiments, the dashboard may include different areas. For instance, the driver's side of the dashboard may house instrumentation and controls for operation of the vehicle 102. For example, the dashboard on the driver's side may comprise a steering wheel and various vehicular indicators, such as an odometer. The dashboard on the passenger's side may comprise a glove compartment or similar storage compartment or panels. The dashboard area 310 between the driver and the passenger seats may include navigation, entertainment, or informational instrumentation or panels (e.g., an infotainment unit, a radio, a navigation display). The design further interior 300 of a vehicle 102 may vary across different vehicles 102 despite providing the same functionality.

Figure 3B:
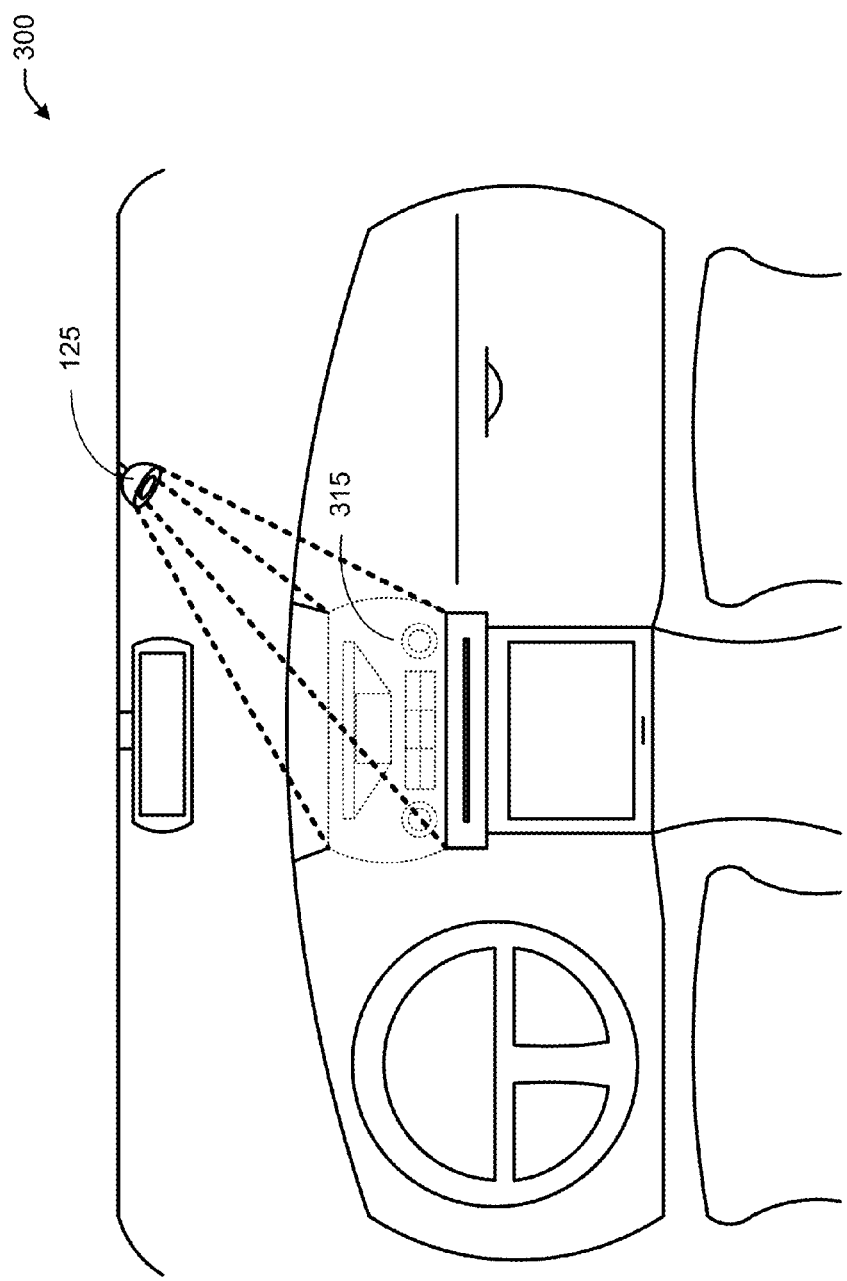
FIG. 3B is a diagram of an example interior of a vehicle with a system for creating a sensory experience in a vehicle, in accordance with an embodiment of the disclosure.

FIG. 3B illustrates an interior 300 of a vehicle 102 with a system for creating a sensory experience in a vehicle 102. In some embodiments, the system may receive device data, such as a design of a dashboard of a different vehicle that may be projected onto a surface of the vehicle 102. The system may then transmit the device data to one or more output modalities, which may include a projector 125. The projector 125 may project or display one or more images based upon the device data onto a surface of the interior 300 of the vehicle 102. For example, as illustrated in FIG. 39, a projector 125 may project or display a different dashboard section 315 onto a portion of the dashboard, such as the dashboard area between the driver and passenger seats.

Figure 4A:
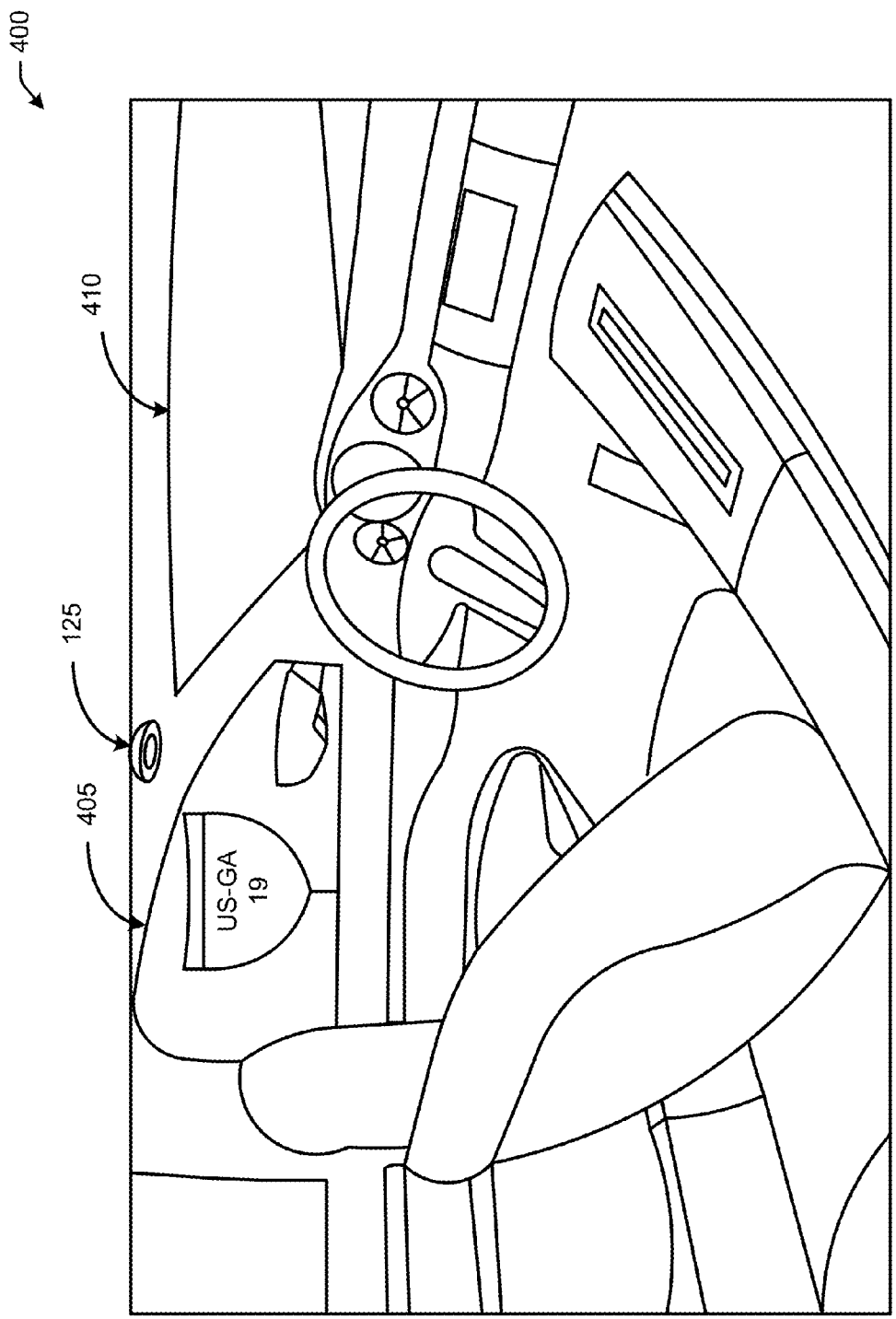
FIG. 4A is a diagram of an example interior of a vehicle.
Figure 4B:
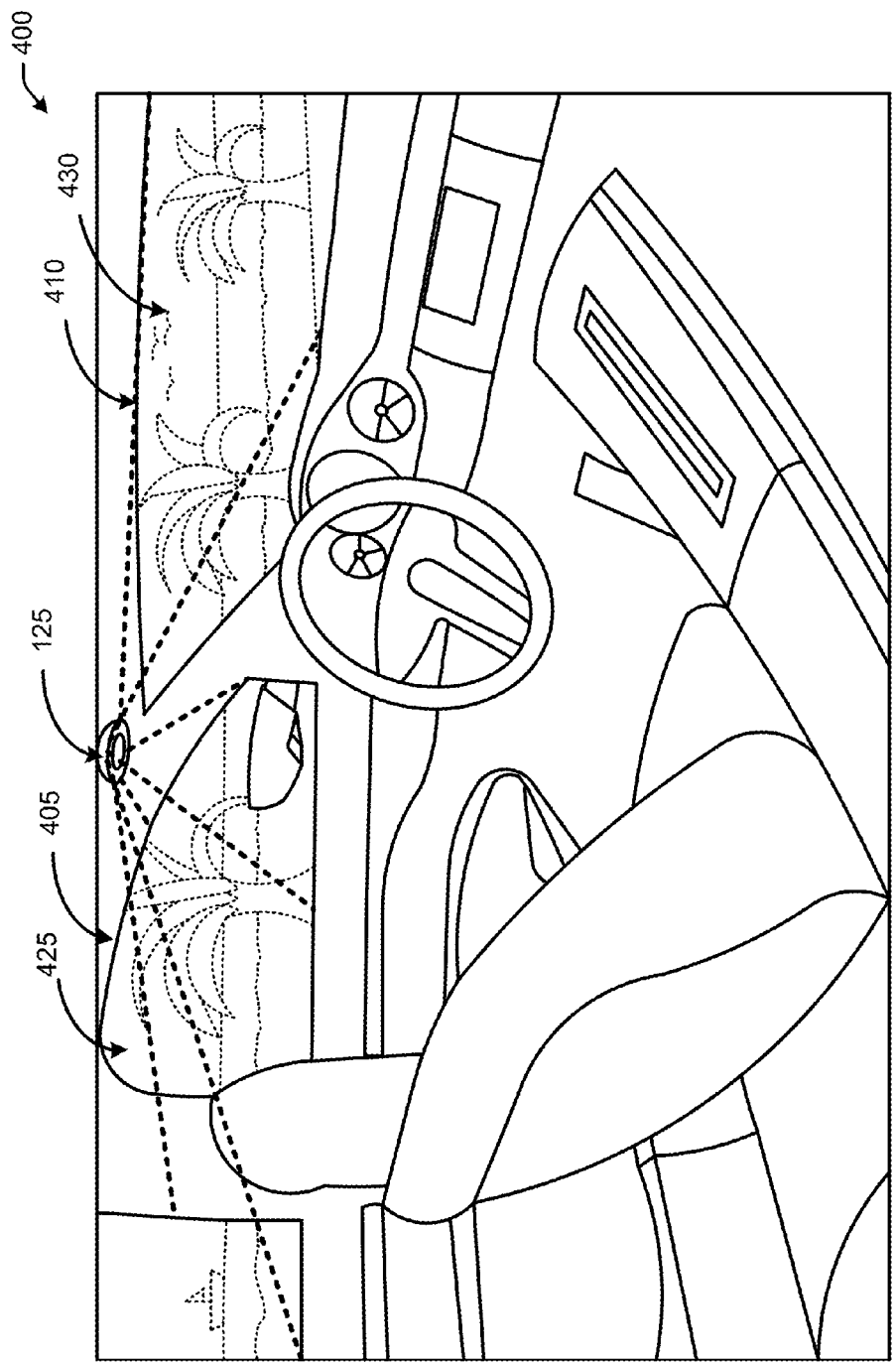
FIG. 4B is a diagram of an example interior of a vehicle with a system for creating a sensory experience in a vehicle, in accordance with an embodiment of the disclosure.

FIG. 4A is a diagram of an example interior of a vehicle. In this illustration, an occupant of the vehicle 102 may view the exterior of the vehicle 102 through the driver's side window 405 or the windshield 410 of the vehicle 102. FIG. 4B illustrates the interior cabin 400 of the vehicle 102 with a system for creating a sensory experience in the vehicle 102. In some embodiments, the system may receive sensed data from one or more sources. For example, the system may receive sensed data associated with a vehicle driving down a highway off the coast of California. The sensed data may be used at least in part to generate device data, which may be transmitted to one or more output modalities (e,g., one or more projectors 125). The projectors may project device data 425, 430, such as the imagery based at least in part on the sensed data received, onto one or more surfaces of the interior cabin 400, such as on the driver's side window 405 or the windshield 410 of the vehicle 102. In some embodiments, the system may not permit display or projection of the device data onto any surface unless the vehicle 102 is in a stationary position. In some embodiments, the system may only be operational in a self-driving or parked vehicle.

Figure 5:
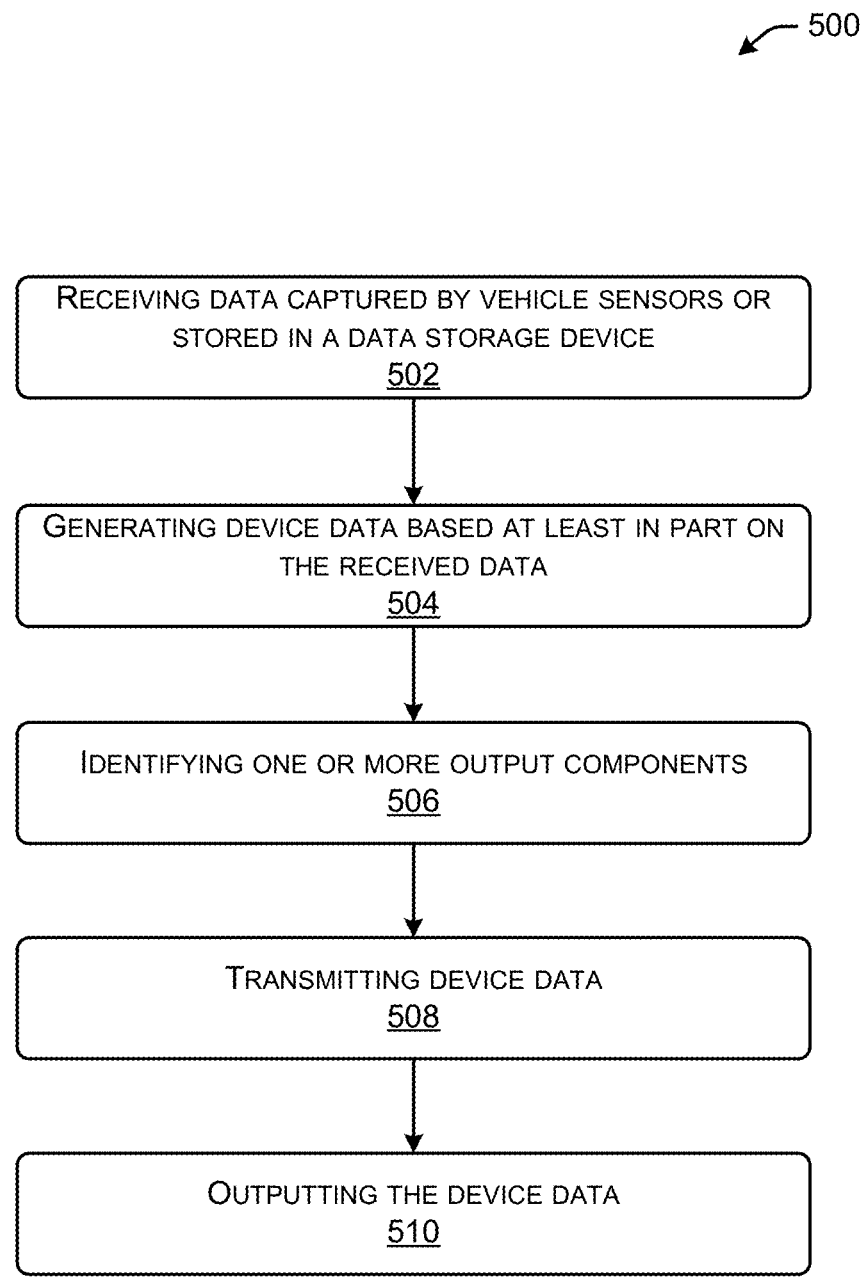
FIG. 5 is a flow diagram of a method for creating a sensory experience in a vehicle, in accordance with an embodiment of the disclosure.

FIG. 5 is a flow diagram of a method for creating a sensory experience in a vehicle, in accordance with an embodiment of the disclosure. In a brief overview, at block 502, the sensed data captured by one or more vehicle sensors or stored in a data storage device may be received. At block 504, device data may be generated based at least in part on the received sensed data. At block 506, one or more output components or modalities may be identified. At block 508, the device data may be transmitted. At block 510, the device data may be outputted by the identified output components or modalities.

At block 502, the sensed data captured by the vehicle sensors or stored in a data storage device may be received from a plurality of vehicle sensors or sensors associated with the vehicle, in some embodiments. For example, one or more electronic devices 140, such as smartphones, may be paired with the vehicle 102. The sensors associated with the electronic devices 140 (e.g., camera phones or microphones) may capture sensed data and transmit the sensed data to the system for generating device data for creating sensory experiences in vehicles 102. In some embodiments, sensed data may be received from data storage devices, such as a remote server 130 outside of the vehicle 102 or a storage device associated with a website. The remote server 130 may enable users to upload or download device data for creating sensory experiences in vehicles. The device data may be user generated or professionally authored (e,g., using specialized equipment which may be mounted on vehicles or generated computer graphics). In sonic embodiments, device data may be received as one or more data streams from one or more data sensors or one or more storage devices associated with the vehicle 102. In some embodiments, device data may be received directly from another vehicle. In other embodiments, users may create or generate device data using data received from one vehicle 102 and upload the device data to a remote server 130, website, database, application store, or other location accessible by others. Another person may download the device data uploaded by the first person and use the device data in their own car. In some embodiments, a user may purchase one or more device data sets from an application store, website, or device data market for a fee. The purchased device data sets may be transmitted directly to the vehicle 102 if the vehicle 102 is capable of receiving the device data sets. In some embodiments, the purchased device data sets may be transmitted to the vehicle 102 by other means (e.g., USB flash drive, CD, DVD, or the like). In some embodiments, a sensory experience device 150 device capable of storing one or more device data sets may be obtained by a user. Device data and or sensed data may be downloaded to the sensory experience device 150. In some embodiments, the sensory experience device 150 may identify one or more output modalities associated with the vehicle 102. The sensory experience device 150 may determine and/or process sensed data and/or device data to determine what information to transmit to the identified one or more output modalities. In some embodiments, the sensory experience device 150 may be removed from the vehicle 102 and connected to one or more electronic devices, such as a laptop or desktop computer. In some embodiments, the connection between the sensory experience device 150 and the electronic device may be wireless or wired. A user may download one or more device data sets or sensed data sets to the sensory experience device 150. The sensory experience device 150 may then be reconnected to the vehicle 102 to replay one or more of the downloaded data sets.

In some embodiments, the system for creating sensory experiences in vehicles 102 may comprise a device to capture input from various sensors associated with the vehicle 102 (e.g., accelerometer, infrared sensors, force sensors, pressure sensors, GPS, motion detectors and sensors, temperature sensors, light and audio sensors, etc.). The device may be responsible for capturing the current state of the vehicle 102 and may activate the various sensors to capture an experience or just the environment to take into consideration while composing or modifying a saved experience.

At block 504, device data may be generated based at least in part on the received sensed data. In some embodiments, the sensed data captured by the one or more sensors or data sources may be processed. For example, algorithms and analytic techniques may be applied to the received sensed data. In some embodiments, more complex processing, such as sensor fusion, may be applied to the sensed data received from the one or more sensors or data sources. Sensor fusion may allow for higher learning function implementations combining input from more than one sensor in order to detect context, surfaces, lighting conditions, and other properties of interest in the vehicle and its surroundings. Content relevant to the experience (e.g., video, sound, objects, surfaces, etc.) may be extracted and then modeled. In some embodiments, the objects may he tracked over time and stored as possible additions to existing device data.

In some embodiments, the device data may be generated based at least in part on the processed sensed data. The device data may be generated using existing device data and modifying elements of the data. In some embodiments, device data may be augmented using components provided by other users or third-party suppliers (e.g., computer-generated components such as visuals of flying in outer space).

At block 506, one or more output components or modalities may be identified. In some embodiments, the output components may include, but are not limited to, projectors, speakers, or environmental systems. Environmental systems of a vehicle may include a heating and air conditioning system associated with the vehicle (e.g., to emulate the wind or outside temperature, or the like) or one or more lights in the vehicle 102 to emulate daylight. In some embodiments, a connection may be established with one or more output devices. In some embodiments, the IVI system 110 may be used to communicate with the output modalities of the vehicle 102. The system for creating a sensory experience in a vehicle 102 may be responsible for the playback of the device data. It may control the output modalities, which could include many projectors set at different angles in order to reach all surfaces of the vehicle, including the windows and furniture. In some embodiments, the one or more output components or modalities may include one or more display panels within the vehicle 102 may be utilized to display imagery based on at least in part the device data set. The output modalities may include speakers, fans, and other modalities that may enable the realistic scene creation. In a supported mode, the system may communicate with the output devices included in the vehicle 102, such as climate control and speakers. The system may also communicate with other associated electronic devices 140, such as a user smartphone or a tablet in order to augment the experience. These devices may show part of the device data or may provide companion information related to the device data generated and replayed. In some embodiments, the system may utilize scene composition features to extract objects and streams from the database and compose the elements needed to execute the experience. These elements may then be transmitted to the output modalities such as projectors, dashboard screens, audio/climate control screens, etc. This may allow the captured experience to be "replayed" in the vehicle. In some embodiments, the system may employ real-time monitoring of the environment and may transmit data to the experience data module 228 so that adjustments in the device data may be made without user intervention.

At block 508, the device data may be transmitted. In some embodiments, the device data may be transmitted to one or more devices for output. For example, instructions may be transmitted, either directly or to the IVI system 110, to adjust a climate control system associated with the vehicle 102 based at least in part on the device data. In some embodiments, the device data may be transmitted to the one or more output components for output to a user of the vehicle. In some embodiments, the device data may be transmitted to a storage device, which may be accessible only to the user or to other users. The system may facilitate access to the stored device data to one or more users via at least one network. In some embodiments, instructions may be transmitted to display the device data on one or more interior surfaces of the vehicle 102. The instructions may include instructions to display the device data on one or more windows of the vehicle 102 or on one or more interior surfaces of the vehicle 102.

At block 510, the device data may be outputted by the identified output components or modalities. In some embodiments, the output components or modalities may receive the device data. The output components or modalities may process the device data and output the device data to create a sensory experience in the vehicle 102. In some embodiments, experiences may be recreated in the vehicle 102 using the device data by utilizing displays, or projecting imagery onto the surfaces of the interior of the vehicle 102 (e.g., dashboard 310, windshield 410, windows 405, or the like). Additionally, an interface associated with the output modalities of the vehicle 102 may permit the user to upload, download, or customize existing device data (e.g., user-generated and/or professional authored device data). The interface may permit the user to purchase device data to play in the vehicle 102 or replay their own experience captured by or in association with the vehicle 102.

In some embodiments, a user interface may be projected onto a surface of the interior of the vehicle 102. One or more cameras may capture one or more users interacting with the projected user interface, and this information may be processed to identify gestures and actions associated with the actions of the system. For example, if a user interface has elements to control the volume of a stereo in the vehicle 102, the cameras may capture images of a user interacting with a projected button to decrease the volume. The system may process the images and determine identified gestures from the images indicating that the user wishes to turn down the volume of the speaker in the vehicle 102. The system may then transmit instructions to the vehicle 102 to modify the volume of the speakers.

Figure 6:
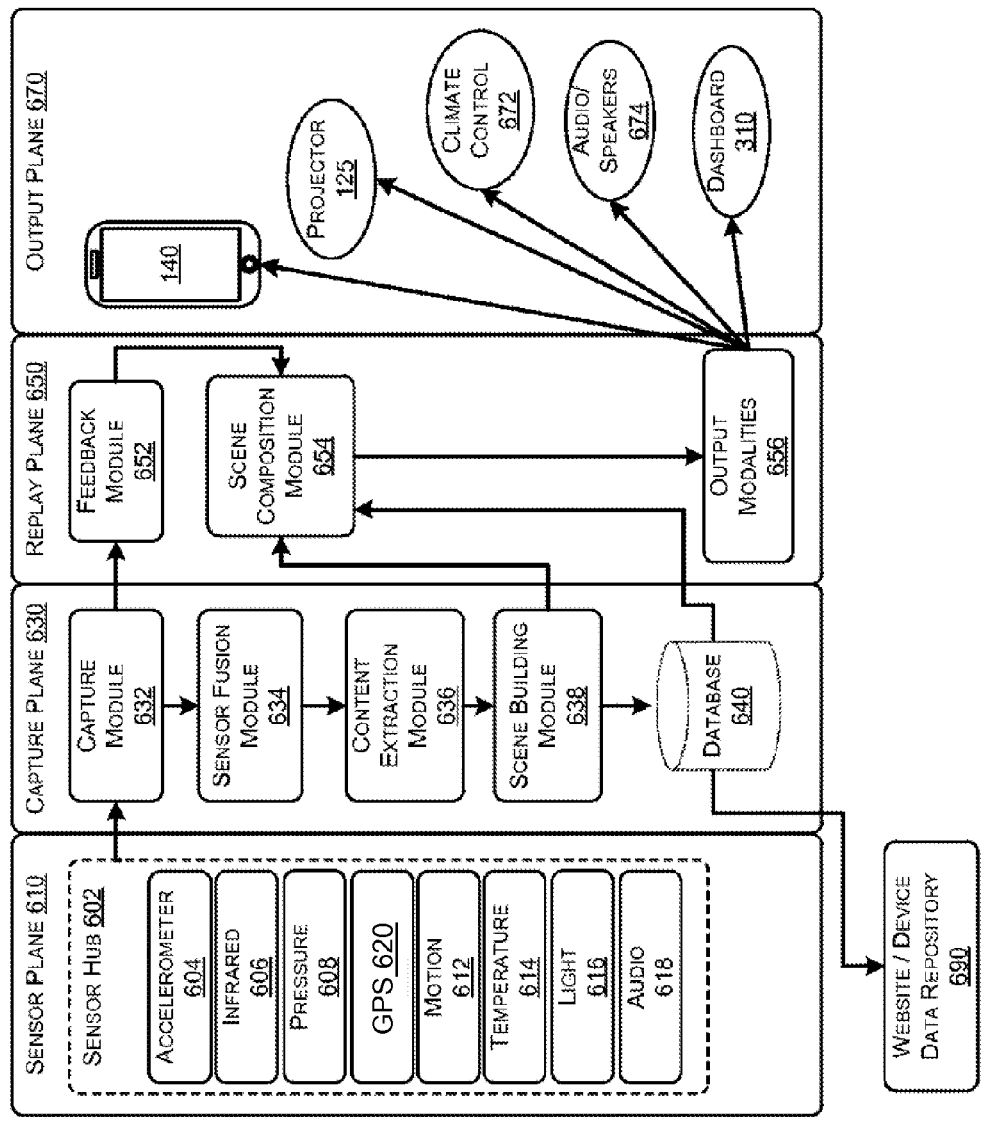
FIG. 6 is a diagram of a configuration for a device for creating a sensory experience in a vehicle, in accordance with an embodiment of the disclosure.

FIG. 6 is a diagram of a configuration for a sensory experience device 150 for creating a sensory experience in a vehicle, in accordance with an embodiment of the disclosure. In a brief overview, the example sensory experience device 150 for creating a sensory experience in a vehicle 102 may comprise four blocks of functionality: a sensor plane 610, a capture plane 630, a replay plane 650, and an output plane 670.

The sensors plane 610 may permit the sensory experience device 150 to capture sensed data from a sensors hub 602 of the sensory experience device 150. The sensor hub 602 of the sensory experience device 150 may be associated with one or more sensors, such as one or more accelerometers 604, one or more infrared sensors 606, one or more pressure sensors 608, a GPS device 620, one or more motion sensors 612, one or more temperature sensors 614, one or more light sensors 616, and one or more audio sensors 618. The sensors hub 602 may capture sensed data for the current vehicle experience. The sensor plane 610 activates one or more device sensors of the sensors hub 602 to capture an experience in the vehicle 102 or capture sensed data associated with the current environment. The captured sensed data associated with the current environment may be used to augment or otherwise be used while generating or modifying device data associated with an experience. In some embodiments, the sensor hub may include one or more sensors that may be used to be more enabling for the experience and would allow for better capture of sensed data.

The capture plane 630 of the sensory experience device 150 may receive the sensed data from the sensor plane 610 at a capture module 632. The sensed data received from the sensor plane 610 may be processed by the capture plane 630.

In some embodiments, the capture plane 630 may process the sensed data received by capture module 632 using relatively simple analytics. In some embodiments, the capture plane 630 may perform more complex processing by the sensor fusion module 634. The sensor fusion module 634 may allow for relatively higher learning function implementations combining sensed data from one or more sensors of the sensor hub 602 in order to detect context, surfaces, lighting conditions, and other properties of interest in the vehicle 102 and its environment. Content relevant to the experience (e.g., video, sound, objects, surfaces, etc.) may be extracted from the sensed data processed by the capture plane 630 at the content extraction module 636. The content extracted by the content extraction module 636 may be transmitted to the scene building module 638. The scene building module 638 may generate device data in the form of objects and conditions, The objects and conditions modeled by the scene building module 638 may be tracked over time. For example, if the sensory experience device 150 is operating in a capture-only mode, the sequence of objects and properties captured by the sensory experience device 150 and modeled by the scene building module 638 over time may be saved into a storage associated with the sensory experience device 150, such as the depicted database 640. The stored device data may then be used to re-create an experience in the future. The device data that is stored in the database 640 may be shared with other users. For example, the device data stored in the database 640 may be shared in an online user community as a collection of synchronized streams that may be replayed. The device data may be uploaded from the database 640 to a remote server 130 or a website/device data repository 690, in addition, the user may download other experience device data (e.g., objects and properties) that others have created from the remote server 130 or website/device data repository 690.

In some embodiments, if the sensory experience device 1150 is operating in a replay mode, the processed sensed data may be used to modify or augment an existing device data set. For every sensor associated with the sensory experience device 150, the sensed data from the vehicle 102 may be used in order to adjust the data stream of the saved device data. For example, the audio input may be used to determine the volume, intensity or other modifications and filters that need to be applied to the saved audio stream before sending the device data to the speakers of the sensory experience device 150, The composed streams of device data may be transmitted to the replay plane 650 of the sensory experience device 150.

The replay plane 650 of the sensory experience device 150 may receive the generated device data from the database 640 of the capture plane 630. The replay plane 650 may be responsible for the playback of an experience based at least in part on the device data generated by the capture plane 630 and stored in the database 640. In some embodiments, the replay plane 650 may playback an experience based at least in part on the device data generated, received, obtained, or purchased from a remote server 130, website/device data repository 690, or the like. The scene composition module 654 may identify and control one or more output modalities 656. The scene composition module 654 may communicate with the output modalities module 656 to transmit device data to replay an experience based at least in part on the device data received from the capture plane 630. The output modalities module 656 may communicate with a plurality of output modalities, which may include one or more components in the output plane 670. Examples of output modalities may include but are not limited to an electronic device 140 associated with the sensory experience device 150 for creating a sensory experience or an electronic device 140 associated with a vehicle 102, one or more projectors 125 (e.g., may be associated with the sensory experience device 150 or may be associated with a vehicle 102), climate control system 672, audio systems (e.g., speakers) 674, and a dashboard 610 associated with the vehicle 102. The scene composition module 654 may process the device data and transmit instructions to the output modalities module 656 to modify or communicate with one or more output modalities. For example, the scene composition module 65.4 may process device data associated with an experience and generate instructions to the output modalities which may include a plurality of projectors 125 set at different angles in the vehicle 102 to reach all surfaces of the vehicle 102, including windows 405, 410 and furniture. The scene composition module 654 may also generate instructions for other output modalities, such as speakers 674 of the sensory experience device 150, climate control systems 672 (e.g., fans) of a sensory experience device 150, and other modalities that would enable the realistic scene re-creation.

If the device was in the supported mode, the sensory experience device 150 may also use the output devices associated with a vehicle 102, such as climate control 672 and speakers 674.

In some embodiments, the output modalities module 656 may connect with other devices, such as an electronic device 140 (e.g., smartphone) associated with a user, in order to further augment the re-creation of an experience. In some embodiments, the associated electronic devices 140 may display part of the experience based at least in part on the device data for the experience. In some embodiments, the associated electronic devices 140 may output companion information related to the experience based on the device data associated with the experience, such as ambient noise that may have been captured or video that may have been captured.

The scene composition module 654 may extract objects and streams of device data from the database 640 and compose the elements needed to recreate the experience. Instructions may be generated by the scene composition module 654 to be transmitted to the output modalities module 656 to output the device data to one or more output modalities, such as projectors 125, dashboards 310 or panels, audio/speaker systems 674, climate control system 672, and the like. The device data outputted by the one or more output modalities permits a recorded/captured experience to be replayed in the vehicle 102 associated with the sensory experience device 150.

In some embodiments, the feedback module 652 of the replay plane 650 may receive sensed data from the capture module 632 of the capture plane 630, to permit real time monitoring of the environment. The captured data may be transmitted to the scene composition module 654 to adjust instructions generated for the output modalities. Such a feedback look permits the scene composition module 654 to recreate experiences based at least in part on the device data without user intervention as the environment continues to change. For example, the feedback module may receive sensed data from the capture module 632 indicating light levels in the environment are changing due to the transition from daytime to nighttime. The scene composition module 654 may receive the sensed data from the feedback module 654 and adjust instructions to the output modalities to compensate for less light in the environment (e.g., increasing brightness output by the projector).

The output plane 670 may be the experience that is recreated in-vehicle (e.g., using displays, projected imagery, ride adjustment, etc.). In addition, a user interface application may allow the user to upload, download, and customize both user generated and professionally authored content, which could be made available for purchase from a remote server 130, website/device data repository 690. A user may also re-play his or her own experiences captured by the sensory experience device 150.

Certain aspects of the disclosure are described above with reference to block and flow diagrams of systems, methods, apparatus, and/or computer program products according to example embodiments. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, certain embodiments may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain embodiments could include, while other embodiments do not include, certain features, elements, and/or operations. Thus, such conditional language is not generally intended to imply that features, elements, and/or operations are in any way required for one or more embodiments or that one or more embodiments necessarily include logic fur deciding, with or without user input or prompting, whether these features, elements, and/or operations are included or are to be performed in any particular embodiment.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A computer-implemented method comprising:
receiving, by one or more processors, sensed data associated with a scene of an outside environment of a vehicle from at least one of one or more sensors associated with the vehicle, one or more sensors of a second vehicle, a database, or a website in real time;
combining the sensed data, by the one or more processors, to generate device data;
extracting, by the one or more processors, one or more objects or streams of device data to create an in-vehicle sensory experience of the scene of the outside environment of the vehicle, wherein content of the in-vehicle sensory experience comprises at least one of one or more videos, sounds, objects, or surfaces;
modifying, by the one or more processors, the device data to compose the outside environment of the vehicle;
identifying, by the one or more processors, one or more output components associated with the vehicle, wherein the one or more output components comprise at least one of one or more projectors, a climate control system, an audio system, or a dashboard panel;
sending, by the one or more processors, instructions to an output module to display the scene of the outside environment of the vehicle on one or more interior surfaces of the vehicle; and
creating, by the one or more processors, the in-vehicle sensory experience in the vehicle by sending the device data to the one or more output components associated with the vehicle for output to a user of the vehicle.

2. The computer-implemented method of claim 1, further comprising storing, by the one or more processors, the device data on a server.

3. The computer-implemented method of claim 1, further comprising receiving, by the one or more processors, a second device data obtained from a device data market.

4. The computer-implemented method of claim 1, wherein the one or more output components comprise at least one of one or more projectors associated with the vehicle, one or more speakers associated with the vehicle, one or more display panels associated with the vehicle, or a heating and air conditioning system associated with the vehicle.

5. The computer-implemented method of claim 1, further comprising:
establishing, by the one or more processors, a connection with one or more devices; and
sending, by the one or more processors, the device data to the one or more devices for output.

6. A system comprising:
one or more computers comprising:
at least one processor; and
at least one memory storing computer-executable instructions, wherein the at least one processor is operable to access the at least one memory and execute the computer-executable instructions to:
receive sensed data associated with a scene of an outside environment of a vehicle from at least one of one or more sensors associated with the vehicle, one or more sensors of a second vehicle, a database, or a website in real time;
combine the sensed data to generate device data;
extract one or more objects or streams of device data to create an in-vehicle sensory experience of the scene of the outside environment of the vehicle, wherein content of the in-vehicle sensory experience comprises at least one of one or more videos, sounds, objects, or surfaces;
modify the device data to compose the outside environment of the vehicle;
identify one or more output components associated with the vehicle, wherein the one or more output components comprise at least one of one or more projectors, a climate control system, an audio system, or a dashboard panel;
send instructions to an output module to display the scene of the outside environment of the vehicle on one or more interior surfaces of the vehicle; and
create the in-vehicle sensory experience in the vehicle by sending the device data to one or more output components associated with the vehicle for output to a user of the vehicle.

7. The system of claim 6, wherein the one or more output components further comprises at least one of one or more speakers, one or more projectors, one or more display panels associated with the vehicle, or an environmental system associated with the vehicle.

8. The system of claim 6, wherein the at least one processor is further configured to execute the computer-executable instructions to:
store the generated device data.

9. The system of claim 8, wherein the at least one processor is further configured to execute the computer-executable instructions to:
facilitate access to the stored device data to one or more users via at least one network.

10. The system of claim 6, wherein the received data comprises at least one of device data associated with the vehicle, device data associated with a second vehicle, or device data generated by a third party.

11. The system of claim 6, wherein the at least one processor is further configured to execute the computer-executable instructions to:
process the received data based at least in part on sensor fusion; and
generate the device data based at least in part on the processed data.

12. A non-transitory computer-readable storage medium having stored therein instructions, that when executed by a computing device, cause the computing device to perform functions comprising:
receiving sensed data associated with a scene of an outside environment of a vehicle from at least one of one or more sensors associated with the vehicle, one or more sensors of a second vehicle, a database, or a website in real time;
combining the received data to generate device data;

extracting one or more objects or streams of device data to create an in-vehicle sensory experience of the scene of the outside environment of the vehicle, wherein content of the in-vehicle sensory experience comprises at least one of one or more videos, sounds, objects, or surfaces;

modifying the device data to compose the outside environment of the vehicle;

identifying one or more output components associated with the vehicle, wherein the one or more output components comprise at least one of one or more projectors, a climate control system, an audio system, or a dashboard panel;

sending instructions to an output module to display the scene of the outside environment of the vehicle on one or more interior surfaces of the vehicle; and creating the in-vehicle sensory experience in the vehicle by sending the device data to the one or more output components associated with the vehicle for output to a user of the vehicle.

13. The non-transitory computer-readable storage medium of claim 12, further comprising:

sending instructions to adjust a climate control system associated with the vehicle based at least in part on the device data.

14. The non-transitory computer-readable storage medium of claim 12, wherein generating the device data further comprises:

processing the received data from the one or more data sensors associated with the vehicle based at least in part on sensor fusion;

extracting relevant content from the processed data; and generating device data based at least in part on the extracted content.

15. The non-transitory computer-readable storage medium of claim 12, further comprising:

projecting a user interface on a surface of the vehicle;

receiving interaction data, wherein the interaction data is captured by one or more vehicle sensors and the interaction data captures the interaction of one or more users with the projected user interface; and processing the interaction data.

16. The non-transitory computer-readable storage medium of claim 15, further comprising sending instructions to one or more vehicle components associated with the user interface based at least in part on the processed interaction data.

* * * * *